(No Model.)

R. T. STARR.
BICYCLE.

No. 514,572.          Patented Feb. 13, 1894.

Witnesses.
Jno B Clark
Y. M. Copenhaver

Inventor.
Raymond T. Starr
By Ruff + Johns his
Attorneys

UNITED STATES PATENT OFFICE.

RAYMOND T. STARR, OF BLOOMINGTON, ILLINOIS.

BICYCLE.

SPECIFICATION forming part of Letters Patent No. 514,572, dated February 13, 1894.

Application filed March 21, 1893. Serial No. 467,041. (No model.)

*To all whom it may concern:*

Be it known that I, RAYMOND T. STARR, a citizen of the United States, residing at Bloomington, in the county of McLean and State of Illinois, have invented certain new and useful Improvements in Bicycles; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in bicycles, and has for its object to produce a bicycle wherein the weight of the rider is utilized to produce the motive power, to propel the machine, and to this end my invention consists in the novel construction and arrangement of parts hereinafter fully described, and afterward definitely pointed out in the claim, due reference being had to the accompanying drawings, forming a part of this specification wherein—

Figure 1:
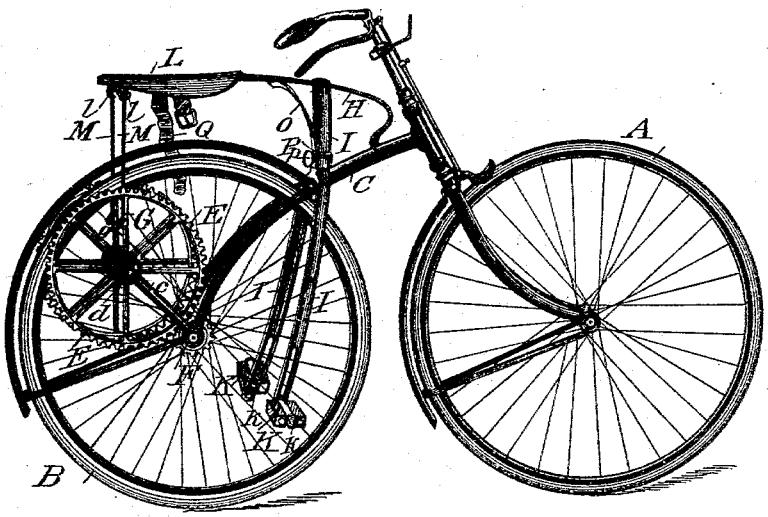
Figure 2:
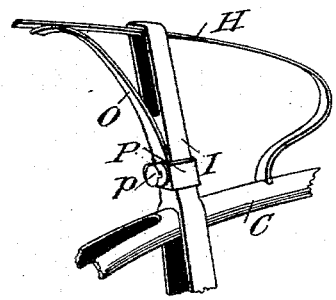
Figure 3:
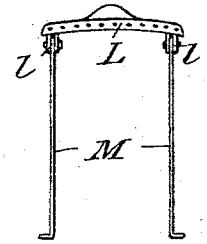
Figure 5:
Figure 4:
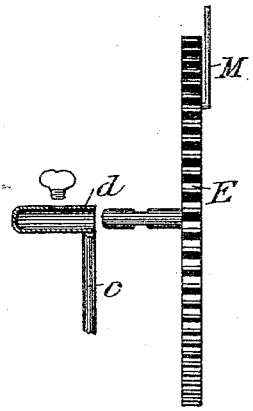

Figure 1 is a side elevation of my improved machine. Fig. 2 is a detail view of the manner of supporting the saddle spring. Fig. 3 is a detail view of the gear wheel bearing; and Fig. 4 is a view illustrating the manner of compensating for the weight of the rider. Fig. 5 is a detail view showing the arrangements of the slot in the rear wheel.

Referring to the drawings the letter A indicates the front wheel and B the rear wheel of the bicycle. The two wheels are connected by means of a connecting bar C, semi-circular in cross-section and consisting of one piece to the point where the foot rest bar is attached thereto, and from that point being bifurcated or forked and extending rearwardly, as at c, and curved downwardly to form bearings for the rear wheel. From the point where the rear wheel is journaled, the bars c extend upwardly and rearwardly and at their extremities are provided with outwardly extending tubes d, forming bearings for gear wheels E, which are journaled therein by the usual and well known bearing boxes. To the axle of the rear wheel are rigidly keyed small gear wheels F, which mesh with the gear wheels E, and each of said gear wheels E has rigidly secured thereto a spoke G provided with a rearwardly inclined slot g for the purpose hereinafter described. To the forward end of the connecting bar C is secured a rearwardly curved spring H, consisting, preferably of a flat strip of resilient metal, bent as shown, and resting in the yoke of a yoked-shaped bar I, secured to the connecting bar C and extending above the same for a suitable distance and bifurcated to embrace the saddle spring as described, and extending below the connecting bar C for a suitable distance, and having adjustably fitted therein a stirrup K, which is adapted to be adjusted up or down to suit the length of the legs of the rider by means of a pin k; it being understood that the said bar projects and extends below the connecting bar upon each side. To the rear end of the spring H is secured a saddle L upon the under side of which are affixed the bearing plates l l, in which are connected the rods and levers M, M, which at their lower ends are bent outwardly and rest in the inclined slots g, the object of the said slots being to carry the rods or levers M. M. past the center. The handle bar and steering wheel are constructed as usual.

In operation the rider bestrides the saddle as usual and by lowering and raising himself upon the stirrups K, K, he communicates a rotary motion to the gear wheel E, which in turn rotates the small gear wheels F keyed upon the axle of the rear wheel of the bicycle.

In the construction of the device the rear and front wheels are set close together, the object in bringing the guide and rear wheel closer together being to save length of iron connecting bar, and also to add to the running quality of the bicycle.

In order to compensate for the difference in weight of riders I provide a spring O, consisting in a flat piece of spring or resilient metal secured at one end to a socket P which is adapted to embrace the bar I and secured thereon at any desired adjusted position by means of a set screw p. It will be understood that by raising or lowering this bent spring O upon which rests the saddle spring H, the force or power of the spring H will be adjusted to the weight of the rider.

Having described my invention, what I claim is—

In a bicycle, the combination with the connecting bar bent upwardly and rearwardly at its rear ends, as shown, driving gears journaled therein, cog wheels on the wheel axle, the said driving gears each provided with a spoke having an inclined slot, and rods or levers pivotally secured to a spring supported saddle and engaging said inclined slots, substantially as described and for the purpose specified.

In testimony whereof I affix my signature in presence of two witnesses.

RAYMOND T. STARR.

Witnesses:
SAIN WELTY,
HENRY CAPUR.